Patented Aug. 15, 1933

1,922,448

UNITED STATES PATENT OFFICE 1,922,448

PRODUCTION OF EXPANDED VERMICULITE

Carl S. Miner, Glencoe, Ill., assignor to William J. Mohr, Chicago, Ill.

No Drawing. Application June 12, 1931
Serial No. 544,046

4 Claims. (Cl. 252—1)

The mineral vermiculite will expand greatly upon heating it, and such distended product has been manufactured in a limited way by merely breaking up the mineral into small size particles and calcining them at a high temperature by dry heat in a rotary kiln or other convenient heating apparatus, and the resulting product, because of its low density, has found use to some extent in the building industry, for example, as a heat and sound insulating medium.

Such expanded material may be as much as fifteen times as bulky as the original raw mineral, but it is extremely friable, so that an undesirable and uneconomical quantity of fine, dusty particles is produced when the material is handled in the ordinary way in connection with manufacturing and building operations.

The heat-insulating properties of vermiculite are so excellent that in expanding it by the method described, it has been impossible to utilize large pieces, because the outside being heated first, expands and forms an insulating, outer layer which prevents the inner portion of the piece from being sufficiently heated to effect the required complete expansion.

An object of the present invention, therefore, is to provide a method by which such vermiculite can be expanded or enlarged without the necessity of preliminary reducing it to small particles.

Another purpose of the invention is to produce expanded or distended vermiculite of such a character that it has neither the tendency nor the ability to form fine dust or powder as a result of ordinary handling.

An added aim of the invention is to supply, from such vermiculite, a new product having entirely novel characteristics in that it consists of non-friable, pliable flakes or chunks of mineral material having many of the physical properties of paper pulp.

My new and improved process consists in heating vermiculite, in either large or small pieces, under pressure, to a temperature in excess of the boiling point of water for a sufficient time to bring the entire body of mineral to such temperature, and then suddenly releasing the pressure, whereby the water in the mineral is transformed into steam and the mineral itself is instantaneously expanded and distended.

In cases where the particles used are of a size which it is possible to expand by dry-heat treatment, the bulk density of the expanded material made by the two processes is substantially the same, but by using particles too large for expansion by the dry-heat method, it is possible and feasible, by applying the explosion method, to produce expanded vermiculite of substantially greater bulk than can be effected by the method of heating at atmospheric pressure.

This is possible of execution, since, by my new method, the heating of the mineral is accomplished prior to the expansion, and it is not necessary to break the vermiculite into small pieces before expanding it to avoid the insulating effect of the expanded part or portion.

By the method of the present invention, it is practicable and even desirable to expand large chunks of the mineral, since these are comminuted in the course of the expansion process, as each large piece breaks up into a number of fractions or chunks, which may, because of the expansion, be either larger or smaller than the original piece of raw vermiculite from which they were formed.

In practicing my process, I introduce the vermiculite into a pressure vessel capable of being opened quickly, such, for example, as the equipment used in the puffing of cereals or wood (sometimes called "guns"), and I preferably, but not necessarily, add sufficient water or steam to insure a steam-saturated atmosphere in the "gun" without taking into account the moisture present in the vermiculite itself, but an excessive quantity of water may be detrimental.

Under certain circumstances, it may be desirable to obtain pressure by the introduction of non-aqueous gas, such as nitrogen, carbon dioxide or air.

If steam alone be used, I then apply heat sufficient to produce a temperature substantially in excess of 212° Fahrenheit and a corresponding steam pressure within the vessel.

This temperature and pressure I maintain for a sufficient time to heat all particles of vermiculite to their centers substantially to the temperature of the steam in the vessel.

I then suddenly or abruptly release the pressure and blow or explode the expanded vermiculite into a receiving chamber, which may be an ordinary type of dust collector, or merely a space enclosed with wire screen of suitable mesh.

Such discharged vermiculite will be found to be expanded to at least fifteen times its ordinary bulk, and, if large pieces be used, it can be distended, swelled, or exploded to even greater bulk, and it will have the feel and many of the other physical characteristics of paper pulp.

The novel puffed or enlarged material is unique, and consequently difficult to describe, but it is perhaps best designated by stating that it is similar to what one might imagine asbestos to be if it existed in the form of flakes or sheets, rather than as threads or fibers.

If pure vermiculite be employed as the raw material, the resulting product is entirely free from any characteristics which might properly be described as hardness.

The expanded vermiculite can be compressed into a coherent, substantially-spherical mass merely by the pressure of the fingers in much the same way as snow can be formed into a snowball, that is it is flexible, plastic, and can be compressed and deformed without rupture.

My explosion-expanded vermiculite is capable of being readily squeezed or condensed into a thin film or foil having a degree of flexibility similar to that of ordinary metal foil.

In manufacturing this new product by my novel process, I can work within a wide range of conditions and still retain the substantial benefits of the invention.

Some expansion of the material will be effected by the use of pressure of fifty pounds or less, but a greater distention or enlargement is attained at pressures in excess of one hundred and twenty-five pounds, and, in some instances, very high pressures may be employed with advantageous results.

I may, for example, introduce vermiculite of particle size up to one inch thickness into a pressure vessel and add sufficient water or steam, preferably the latter, to insure filling the unoccupied volume of the gun with saturated steam at the explosion pressure. Heat is applied, as by means of a steam-jacket or other suitable heating device, until a pressure of 375 pounds per square inch is reached in the digester, and such pressure is maintained for a few minutes, until all of the particles are thoroughly heated. The pressure is then suddenly released and the expanded vermiculite ejected into a chamber, as previously described. A prolonged heating of the vermiculite in the gun before exploding gives a greater amount of fines than when the heat is applied quickly to obtain the explosion pressure. A heating period of ten minutes for a six-inch diameter gun has been found to give good results.

Such new product can be advantageously utilized in many different ways in the arts, as it is suitable for use as a heat or sound insulating medium, as a lubricant in bearings, as a polishing agent, for instance, in toothpaste or metal polishes, as a gasket material, as a component or constituent of paints, as a paper filler, etc.

Also, when the expanded vermiculite is utilized in cementitious materials, particularly Portland cement products, it markedly improves their nailing and nail-adhering powers, and, in addition, it betters those properties of the material which permit it to be sawed.

The improved vermiculite manufactured according to this method is an aid in filtration and it has certain adsorptive properties.

It can be used to advantage as a weight-reducing or as a coloring medium in ceramic and cementitious products, and, at the same time, particularly in the case of the latter, it will assist in heat insulation and in preventing sound transmission, as well as promoting sound absorption.

It has possibilities as an addictive agent to paper and certain organic materials to improve their resistance to the action of fire and to obtain other desirable properties.

Because of its felting quality or attribute, it is particularly useful as a component of roofing materials, in combination with fibers and/or bituminous material.

Additionally, the expanded vermiculite is valuable in combination with asbestos fiber for the formation of boards, sheets and the like.

It has possibilities in the form of dies for casting various materials, and can be used in annealing.

In some of the above-noted uses it may be necessary to add certain materials to improve the resistance of the product to water, and, in considering the specified ways in which this new product may be employed, it should be understood that the characteristics of the distended vermiculite made by the new process are materially different from those of vermiculite produced by the old calcining method, and, consequently, it can be satisfactorily used in many ways and for divers purposes where such calcined vermiculite has little value.

Those acquainted with this art will readily understand that the invention is not limited or restricted to the precise and exact details set forth, and that more or less changes may be resorted to in the performance of the process without departure from the heart and essence of the invention as defined by the appended claims, and without the loss or sacrifice of any of its substantial or material benefits or advantages.

I claim:

1. The method of explosively expanding a vermiculite, consisting in subjecting the vermiculite at a temperature exceeding 212° Fahrenheit to a pressure substantially greater than atmospheric and then suddenly releasing such pressure.

2. The method of explosively expanding a vermiculite, consisting in enveloping the vermiculite in steam at approximately 300 pounds pressure per square inch and then suddenly releasing such pressure.

3. The method of explosively expanding a vermiculite, consisting in moistening the vermiculite and subjecting the moistened material at a temperature exceeding 212° Fahrenheit to a pressure substantially greater than atmospheric and then suddenly releasing such pressure.

4. Expanded vermiculite characterized by the property that it is capable of being compressed both parallel to and at right angles to its cleavage planes without substantial disintegration.

CARL S. MINER.